(12) United States Patent
Furuya

(10) Patent No.: US 9,329,585 B2
(45) Date of Patent: May 3, 2016

(54) ARTICLE ASSEMBLING DEVICE USING ROBOT

(71) Applicant: FANUC CORPORATION, Minamitsuru-gun, Yamanashi (JP)

(72) Inventor: Yoshitake Furuya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 743 days.

(21) Appl. No.: 13/713,276

(22) Filed: Dec. 13, 2012

(65) Prior Publication Data

US 2013/0218324 A1    Aug. 22, 2013

(30) Foreign Application Priority Data

Feb. 17, 2012    (JP) ................................. 2012-033173

(51) Int. Cl.
    *G05B 15/02*    (2006.01)
    *B25J 9/16*    (2006.01)

(52) U.S. Cl.
    CPC ............... *G05B 15/02* (2013.01); *B25J 9/1687* (2013.01); *G05B 2219/39109* (2013.01); *Y10S 901/02* (2013.01); *Y10S 901/47* (2013.01)

(58) Field of Classification Search
    CPC ..................... G05B 15/02; G05B 2219/39109; B25J 9/1687; Y10S 901/47; Y10S 901/02
    See application file for complete search history.

(56) References Cited

U.S. PATENT DOCUMENTS

| | | | | |
|---|---|---|---|---|
| 4,179,230 A | * | 12/1979 | Kitagawa | B23B 41/003 408/39 |
| 4,547,212 A | * | 10/1985 | Nebelung | C03B 9/447 65/239 |
| 5,203,811 A | * | 4/1993 | Hirotani | B62D 65/06 29/407.05 |
| 5,216,800 A | * | 6/1993 | Nishigori | B62D 65/06 29/407.04 |
| 5,399,302 A | * | 3/1995 | Noguchi | B29C 49/70 264/40.7 |
| 5,503,516 A | * | 4/1996 | Kasai | B23P 19/001 221/134 |
| 5,509,190 A | * | 4/1996 | Nakagawa | B23P 19/10 29/712 |
| 5,608,956 A | * | 3/1997 | Seki | B60N 2/44 29/434 |

(Continued)

FOREIGN PATENT DOCUMENTS

| | | |
|---|---|---|
| CN | 102015427 A | 4/2011 |
| JP | 11-170127 A | 6/1999 |
| JP | 2011011691 A | 1/2011 |

(Continued)

OTHER PUBLICATIONS

Japanese Office Action with English translation dated Apr. 16, 2013.

*Primary Examiner* — Ramesh Patel
(74) *Attorney, Agent, or Firm* — Hauptman Ham, LLP

(57) ABSTRACT

An assembling device which does not use a positioning device for articles to be assembled, nor a feeder mechanism and a pneumatic mechanism for a bolt for assembling. The article assembling device includes a first robot which takes out and aligns a bolt by using a detection result of a first camera; a second robot which grips a first article by using a detection result of a second camera and conveys the first article to a position where the first article can be attached to a second article; and a bolt holding and fastening section which fastens the articles by using the aligned bolt.

6 Claims, 6 Drawing Sheets

(56) References Cited

U.S. PATENT DOCUMENTS

| | | | | |
|---|---|---|---|---|
| 5,640,750 A * | 6/1997 | Yoshida | ............... | B23Q 7/1426 29/281.5 |
| 6,328,523 B1 * | 12/2001 | Watanabe | ............. | B25J 9/1687 198/396 |
| 6,886,241 B2 * | 5/2005 | Tachibana | ............ | B23P 19/043 29/281.5 |
| 2006/0064870 A1 * | 3/2006 | Furuya | ................... | H01R 43/20 29/747 |
| 2010/0319182 A1 * | 12/2010 | Sugimoto | ................. | B25J 5/04 29/428 |
| 2011/0048649 A1 * | 3/2011 | Komatsu | ............... | B23P 19/069 157/1.35 |
| 2011/0185556 A1 * | 8/2011 | Hirano | ................... | B25J 9/0084 29/428 |

FOREIGN PATENT DOCUMENTS

| | | |
|---|---|---|
| JP | 2011036975 A | 2/2011 |
| JP | 2011156647 A | 8/2011 |

* cited by examiner

ARTICLE ASSEMBLING DEVICE USING ROBOT

RELATED APPLICATIONS

The present application is based on, and claims priority from, Japanese Application Number 2012-033173, filed Feb. 17, 2012, the disclosure of which is hereby incorporated by reference herein in its entirety.

BACKGROUND OF THE INVENTION

1. Field of the Invention

The present invention relates to a device for assembling articles by using a robot.

2. Description of the Related Art

In the prior art, in order to improve productivity, a device for automatically assembling articles has been proposed. For example, Japanese Unexamined Patent Publication (Kokai) No. 11-170127, which discloses an automatic assembling device for attaching a balancer cover to a cylinder block of a motorcar engine, describes that "three bolts 12 are transported by air pressure from a ball feeder 36 to a temporary bolt table 37, and three bolts 12 are supplied to second holding part 40 of temporary assemble table 35 from temporary bolt table 37. Circular opening 72 is formed in bolt holding mechanism 71 of second holding part 40, and bolt containing cylinder 73, which projects below temporary assemble table 35 in the vertical direction, is arranged in opening 72. Therefore, bolt 12 is inserted in the upward direction while a head of the bolt is downwardly oriented."

In the automatic assembling device as described in Japanese Unexamined Patent Publication (Kokai) No. 11-170127, the holding mechanism and/or a positioning mechanism, for precisely positioning a component to be attached such as the cylinder block and/or the balancer cover, is necessary. Further, a feeder mechanism and/or a pneumatic transport mechanism, for aligning and supplying components used for assembling such as bolts, is necessary. Accordingly, the entire device may become complicated, and the cost of the device may be high.

SUMMARY OF THE INVENTION

An object of the present invention is to provide an article assembling device, which does not use a positioning device for articles to be assembled, nor a feeder mechanism and a pneumatic mechanism for a bolt for assembling.

According to the present invention, an article assembling device for taking out and aligning bolts, and attaching a first article to a second article by means of the aligned bolt is provided, the assembling device comprising: a first detecting section which detects a position of at least one bolt to be taken out among a plurality of randomly located bolts; a first robot having a first robot hand configured to take out the bolt by using positional information of the bolt detected by the first detecting section, and then align and locate the taken out bolt on a bolt placement table; a second detecting section which detects a position of the first article; a second robot having a second robot hand configured to grip the first article by using positional information of the first article detected by the second detecting section, and then move the first article to an assembling position where a connecting part of the first article and a connecting part of a second article located at a predetermined place contact each other; and a bolt holding and fastening section configured to take out and hold the bolt aligned and located on the bolt placement table, and then rotate the bolt about an axial direction thereof, wherein the bolt holding and fastening section takes out and holds the bolt aligned and located on the bolt placement table, and then assembles the first article and the second article by fastening the first and second articles with the bolt while the connecting parts of the first and second articles contact each other.

In a preferred embodiment, the article assembling device further comprises an external holding device which receives the first article conveyed to the assembling position by the second robot, and holds the first article at the assembling position, wherein the bolt holding and fastening section is mounted to the second robot, and the bolt holding fastening section mounted to the second robot fastens the first article held by the external holding device and the second article.

In a preferred embodiment, the article assembling device further comprises a third robot to which the bolt holding and fastening section is mounted, wherein the second robot is configured to hold and convey the first article to the assembling position, and hold the first article at the assembling position, and wherein the bolt holding fastening section mounted to the third robot fastens the first article held by the second robot and the second article.

In a preferred embodiment, the article assembling device further comprises: an external holding device which receives the first article conveyed to the assembling position by the second robot, and holds the first article at the assembling position; and a third robot to which the bolt holding and fastening section is mounted, wherein the bolt holding fastening section mounted to the third robot fastens the first article held by the external holding device and the second article.

In a preferred embodiment, the first detecting section is a first vision sensor having a first camera mounted to the first robot, and the second detecting section is a second vision sensor having a second camera mounted to the second robot.

In a preferred embodiment, the bolt holding and fastening section has a rotatable front part and a magnet arranged at the rotatable front part.

BRIEF DESCRIPTION OF THE DRAWINGS

The above and other objects, features and advantages of the present invention will be made more apparent by the following description of the preferred embodiments thereof with reference to the accompanying drawings wherein.

DETAILED DESCRIPTION

Figure 1:
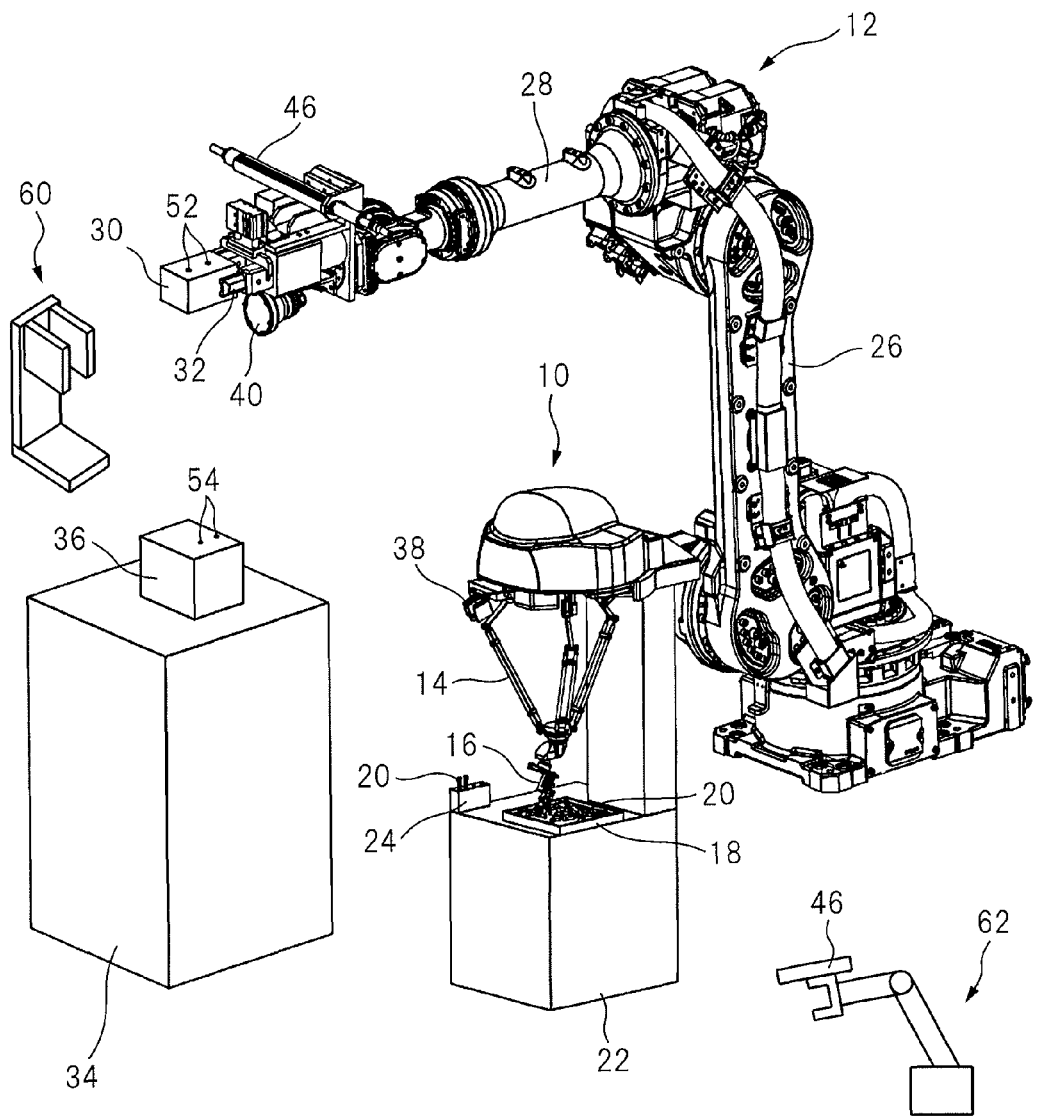
FIG. 1 shows a preferred embodiment of an article assembling device according to the present invention.
Figure 2:
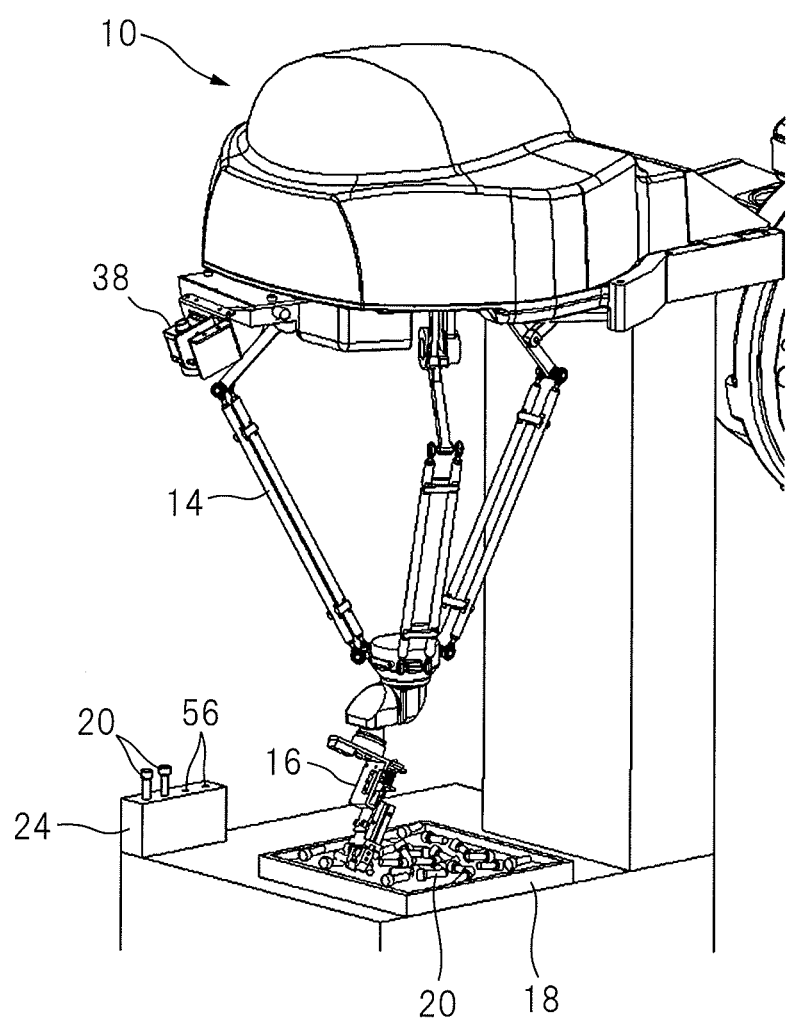
FIG. 2 is an enlarged view around a first robot.

FIG. 1 shows a preferred embodiment of an article assembling device according to the present invention. The article assembling device includes a first robot 10 which takes out and aligns fastening means (a bolt in the illustrated embodiment), and a second robot 12 which assembles at least two articles. As apparent from FIG. 2, first robot 10 has a first robot arm 14 configured to be rotated about each axis (for example, six axes), and a first holding section 16 such as a robot hand attached to a front end of a first robot arm 14. First holding section 16 is configured to sequentially hold and take out a plurality of bolts 20 which are randomly located in a container 18, and position bolt 20 in a predetermined attitude (for example, the bolt is aligned in a vertical attitude) on a bolt placement table 24 located at a predetermined place (for example, on a first pedestal 22). Instead of gripping-type first robot hand 16, a nozzle capable of sucking and holding bolt 20 by using sucking force generated by sucking air, or an electric magnet capable of attracting and holding bolt 20 by using magnetic force, may be used.

As shown in FIG. 1, for example, second robot 12 is a six-axis robot having an upper arm 26 and a forearm 28. At a front end of forearm 28, a second holding section 32 capable of holding one of articles to be assembled (first article 30) is attached. In the illustrated embodiment, second holding section 32 is a second robot hand capable of gripping first article 30. Second robot 12 may convey first article 30 held by second holding section 32 so that first article 30 is moved to the position and attitude where first article 30 may be attached to a second article 36, which is located on at a predetermined place (on a second pedestal 34 in the illustrated embodiment) and is to be assembled to first article 30 (concretely, connecting portions of the articles contact each other).

First robot 10 has a first camera 38 configured to capture an image of at least one (preferably, all) of a plurality of bolts 20 which are randomly located in container 18. First camera 38 constitutes a first detecting section (or first vision sensor) cooperatively with an image processor (not shown) which processes an image captured by first camera 38, whereby the position and attitude of the bolt to be taken out by first robot 10 may be detected. In the illustrated embodiment, first camera 38 is fixed at a lower part of a body of first robot 10. However, the position of first camera 38 is not limited as such as long as the first camera may capture an image of the bolt to be taken out. For example, first camera 38 may be attached to a movable part such as first robot arm 14, or a stationary part other than the robot.

Figure 3:
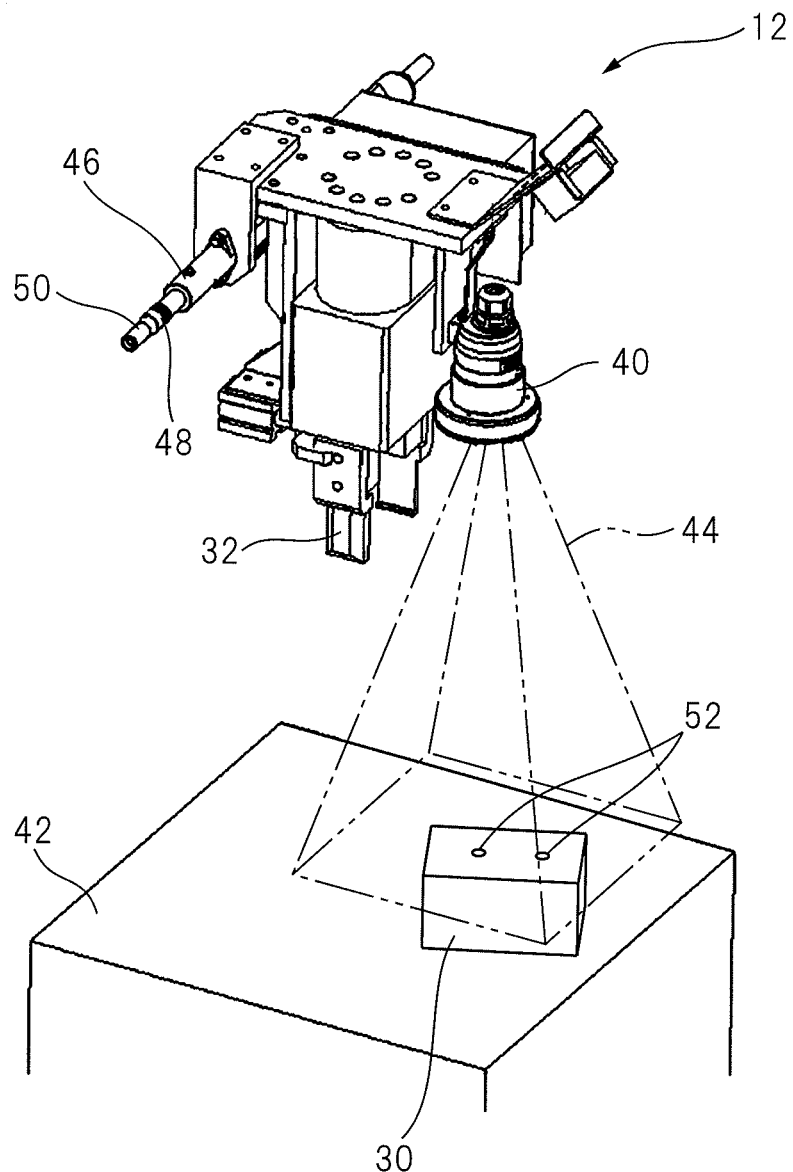
FIG. 3 shows a state wherein an article is detected by a second detecting section attached to a second robot.

Second robot 12 has a second camera 40 configured to capture an image of first article 30 which is to be gripped by second holding section 32. Second camera 40 constitutes a second detecting section (or second vision sensor) cooperatively with an image processor (not shown) which processes an image captured by second camera 40, whereby the position and attitude of first article 30 to be taken out by second robot 12 may be detected. For example, as shown in FIG. 3, second camera 40 is attached to a movable part of second robot 12 (for example, a part near second robot hand 32), and second robot 12 is operated so that first article 30 located on a third pedestal 42 is within a field of view of second camera 40 (indicated by two-dot chain line 44). Based on information of the position and attitude of first article 30 obtained in this way, second robot 12 may be operated so that second robot hand 32 grips first article 30. In the illustrated embodiment, second camera 40 is attached to the front end of forearm 28 of second robot 12. However, the position of second camera 40 is not limited as such as long as the second camera may capture an image of first article 30 held by second robot arm 32. For example, second camera 40 may be fixed near third pedestal 42.

Figure 4:
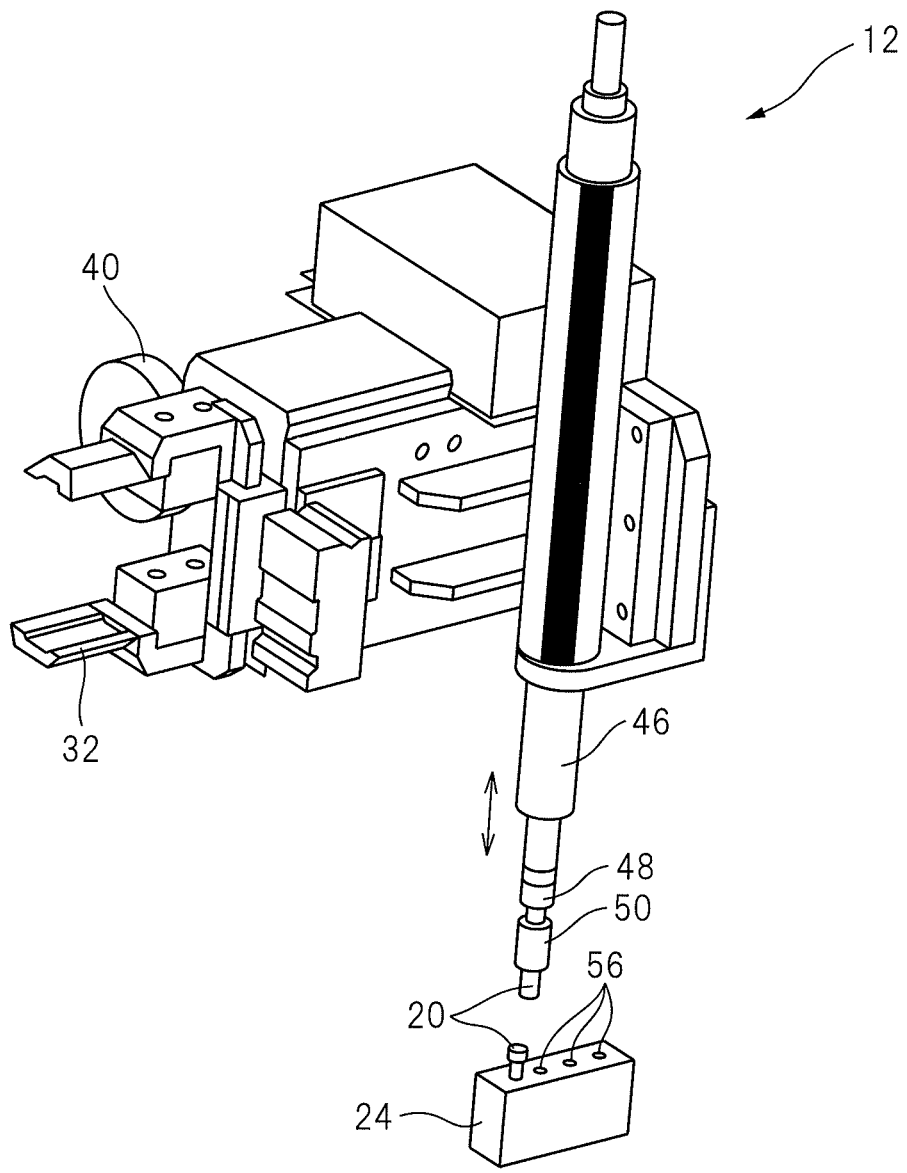
FIG. 4 shows a state wherein a bolt is held and taken out by a bolt holding and fastening section attached to the second robot.

As shown in FIGS. 1 and 3, second robot 12 (for example, the front end of forearm 28) has a bolt holding and fastening section 46 which takes out bolt 20 aligned and positioned on bolt placement table 24 and fastens the articles by means of the bolt. Bolt holding/fastening section 46 is a device capable of holding a head portion of bolt 20 and rotating the bolt about the axial direction thereof. For example, bolt holding and fastening section 46 has a rotatable front part 48 and a magnet 50 attached to rotatable front part 48. By using bolt holding and fastening section 46, as exemplified in FIG. 4, second robot 12 may be operated so that bolt holding and fastening section 46 approaches one of bolts 20 aligned and positioned on bolt placement table 24, and then attracts and holds the bolt. Bolt 20, held by bolt holding and fastening section 46, is inserted into holes 52 and 54, which are respectively formed on first and second articles 30 and 36 (see FIG. 1), while the first and second articles are combined, and then bolt 20 is used to assemble and fasten the articles. In addition, magnet 50 may be a permanent magnet or an electric magnet, the permanent magnet is preferable in terms of cost.

In the embodiment, the vision sensor is used to detect the bolt and the first article. However, the present invention is not limited as such, for example, another detecting section such as a photoelectric sensor may be used.

Figure 5:
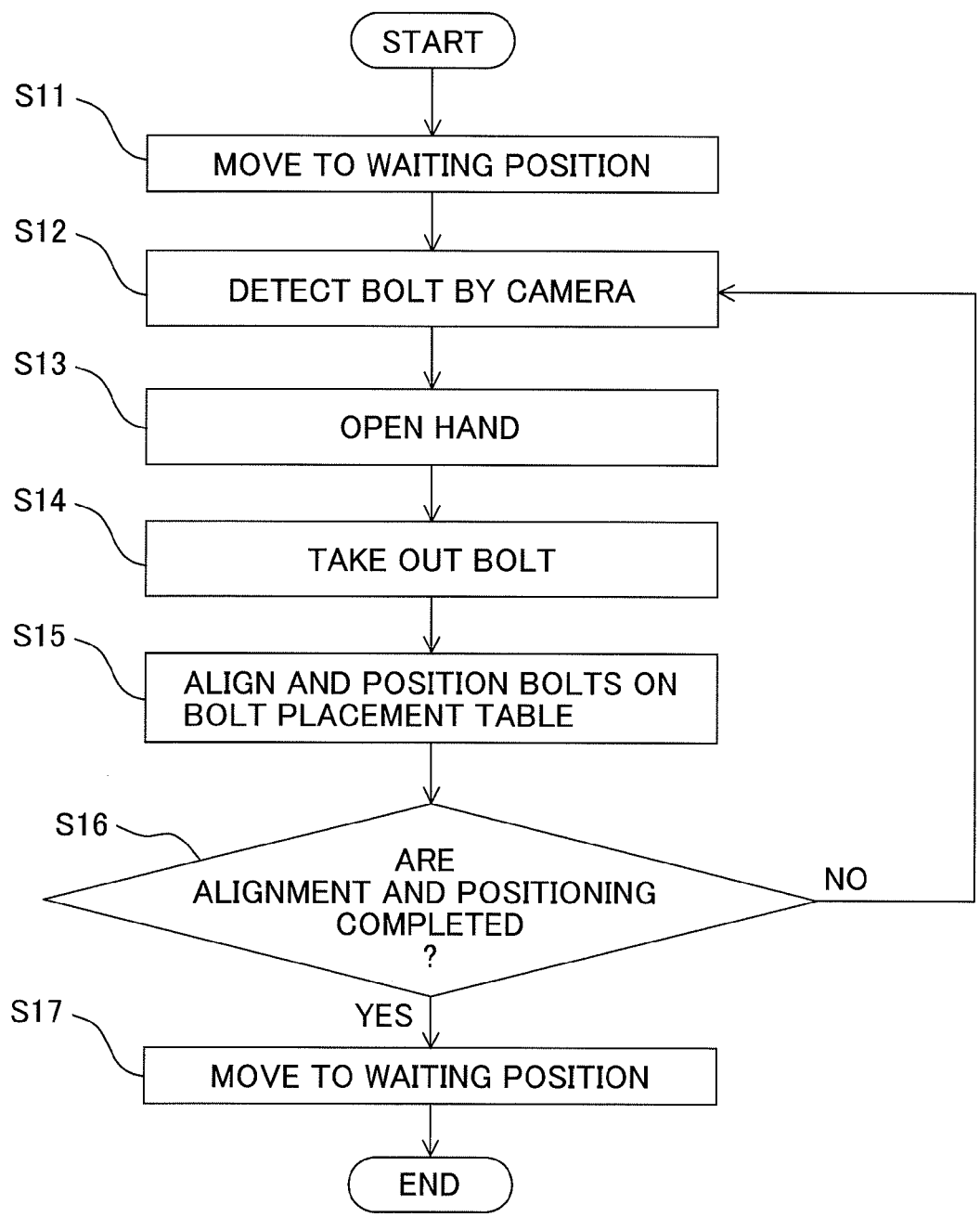
FIG. 5 is a flowchart indicating a process for taking out and aligning the bolt.

Hereinafter, the assembling process using the article assembling device of the invention is explained with reference to flowcharts of FIGS. 5 and 6. First, as shown in the bolt taking out process of FIG. 5, first robot 10 is moved to a predetermined waiting position (step S11). As the predetermined waiting position, a position, to which first robot arm 14 is moved so that the first robot arm does not obstruct capturing an image of bolt(s) 20 in container 18 by means of first camera 38, may be possible.

Next, an image of bolt(s) 20 in container 18 is captured by first camera 38, and the position (preferably, the position and attitude) of bolt 20 to be taken out by first robot hand 16 is detected (step S12). Then, based on information of the position (preferably, the position and attitude) of the detected bolt, first robot hand 16 approaches bolt 20 to be taken out, the hand is opened if robot hand 16 is a gripping-type hand (step S13), and then the bolt is taken out by first robot hand 16 (step S14).

Next, bolt 20 taken out (and held) by first robot hand 16 is positioned on bolt placement table 24 (step S15). In the illustrated embodiment, on an upper surface of bolt placement table 24, a plurality of (four in the illustrated embodiment) insert holes 56 are formed (see FIG. 2). Each hole 56 extends in a generally vertical direction and has a length smaller than an axial length of bolt 20, and bolt 20 is inserted into hole 56 so that the head portion of the bolt is upwardly oriented.

In the next step S16, it is detected or judged whether the alignment of the bolts is completed, concretely, bolts 20 are inserted into all of holes 56 of bolt placement table 24. As a method for the judgment, positioning a photoelectric sensor for detecting the existence or non-existence of bolt 20 in each hole 56 and utilizing a detection result of the photoelectric sensor; capturing an image of bolt placement table 24 by first camera 38 or another camera and judging the existence or non-existence of the bolt in each hole 56 based on a result of processing the obtained image; or judging whether first robot hand 16 has repeated the gripping and inserting operation of the bolt without trouble, the number of times same as the number of holes 56 formed on bolt placement table 24 (four in the illustrated embodiment), by means of a counter, etc.

In step S16, when it is judged that there is any hole 56 to which bolt 20 is not inserted, the process is returned to step S12 and another bolt to be taken out is detected. On the other hand, when bolt 20 is inserted in any of through holes 56, first robot had 16 is returned to the waiting position (step S17).

Figure 6:
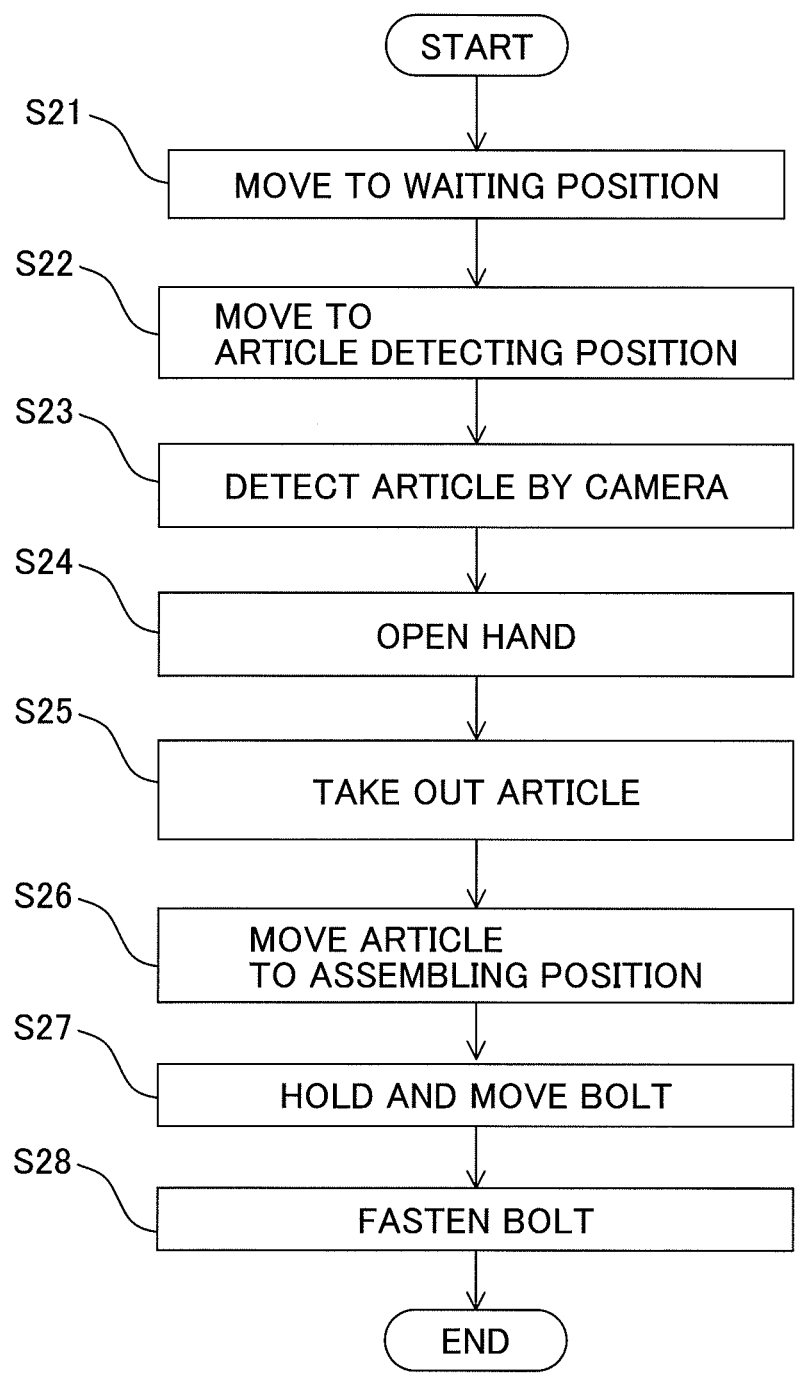
FIG. 6 is a flowchart indicating a process for conveying and assembling the article.

FIG. 6 shows an assembling process of articles by mainly using second robot 12. First, second robot 12 is moved to a predetermined waiting position (step S21). As the predetermined waiting position, a position, where second robot does not interfere with an operating range of first robot 10 or another peripheral, may be possible. However, it is preferable that the waiting position is relatively close to an article detecting position to which the second robot is moved in the next step, in view of a cycle time, etc.

Next, second camera 40 is moved to an article detecting position where an image of first article 30 to be assembled can be captured (step S22). In the embodiment, second camera 40 is mounted to second robot 12, as shown in FIG. 3, second robot 12 is operated so that first article 30 is within a field of view 44 of second camera 40.

In the next step S23, an image of first article 30 is captured by second camera 40 so that the position and attitude of first article 30 are detected. Then, second robot hand 32 approaches first article 30 to be assembled, the hand is opened if robot hand 32 is a gripping-type hand (step S24), and then first article 30 is taken out by second robot hand 32 (step S25).

Next, first article 30 taken out (or gripped) by second robot hand 32 is moved to an assembling position (step S26). In other words, first article 30 is moved to the position and attitude which are substantially the same as the position and attitude of first article 30 when first and second articles 30 and 36 are assembled (concretely, the connecting portions of the articles contact each other). For example, in the illustrated embodiment, first article 30 is stacked on second article 36 so that a screw hole or through hole 52 of first article 30 is aligned with a screw hole 54 of second article 36.

When the connecting portions of the first and second articles are generally horizontal surfaces, as in the embodiment, the positional relationship between the articles is not changed even when second robot hand 32 releases first article 30. However, when the connecting portions are inclined surfaces, for example, the positional relationship between the articles may be changed when second robot hand 32 releases first article 30. Therefore, in order to assuredly avoid change in the positional relationship between the articles, external holding device 60 (schematically shown in FIG. 1) may be arranged, the external holding device being configured to hold first article 30 so that the position and attitude of first article 30 are not changed after the first article is positioned at the assembling position. As external holding device 60, a simple configuration such as an open/close-type chuck structure, capable of receiving first article 30 positioned at the assembling position from second robot hand 32, may be used.

In the next step S27, by using bolt holding and fastening section 46, bolt 20 aligned on bolt placement table 24 is taken out and moved. Then, in the next step S28, held bolt 20 is inserted into hole 52 of first article 30 and hole 54 of second article 36, and then bolt 20 is fastened (rotated). By virtue of this, the assembling process of the articles is completed.

In the illustrated embodiment, since bolt holding and fastening section 46 is mounted to second robot 12 which holds and positions first article 30, first article 30 is held as required by the external holding device, etc., after the positioning of first article 30 is completed. However, the present invention is not limited to as such, for example, bolt holding and fastening section 46 may be mounted to a third robot 62 (schematically shown in FIG. 1) which is different from the first and second robots. In this case, third robot 62 functions as a device for holding and taking out bolt 20 aligned on bolt placement table 24, and for fastening the first and second articles by means of the bolt after the articles are attached to each other, by using bolt holding and fastening section 46. When third robot 62 is used, second robot 12 may be used as a holding device for first article 30 after positioning first article 30 at the assembling position (step S26), whereby external holding device 60 is not necessary. Further, since the gripping-type robot hand has a high degree of freedom for the shape of the article, the robot hand is flexible about change in a kind of the article.

Even when third robot 62 is used, external holding device 60 may be optionally used. In this case, while third robot 62 carries out the fastening operation (step S28) for the article held by external holding device 60, second robot 12 may carry out the detecting/conveying operation (steps S22 to S25) for another article to be used in another (or the next) assembling process. Therefore, a cycle time when a plurality of assembling processes should be carried out may be reduced.

According to the present invention, the position of the article to be assembled and/or the bolt is detected by the detecting section such as the vision sensor, the robot(s) takes out and conveys the article and the bolt, and assembles the articles by using the obtained positional information. Therefore, a supplying device and a positioning device for the article and the bolt are not necessary. Due to this, the assembling device, capable of assembling the articles with practicable accuracy while having a simple configuration, may be provided.

By using the external holding device for holding the first and second articles in the assembled state, the operation of taking out and conveying the article and the bolt, and assembling the articles, may be carried out by the two robots.

By mounting the bolt holding and fastening section to the third robot, the second robot may hold the first article at the assembling position, whereby the assembling device may be flexible about change in a kind of the article.

By mounting the bolt holding and fastening section to the third robot and further using the external holding device, the operation of conveying and fastening the bolt may be carried out in parallel with the taking out process of the article by the second robot, whereby the cycle time may be reduced.

By detecting the article to be taken out by means of the vision sensor, a positioning mechanism becomes unnecessary.

By using a magnet at the rotatable front end of the bold holding and fastening section, it is not necessary to use a holding mechanism such as a chuck for fastening or loosening the bolt, whereby the assembling device may be simplified.

While the invention has been described with reference to specific embodiments chosen for the purpose of illustration, it should be apparent that numerous modifications could be made thereto, by a person skilled in the art, without departing from the basic concept and scope of the invention.

The invention claimed is:

1. An article assembling device for taking out and aligning bolts, and attaching a first article to a second article by means of the aligned bolt, the assembling device comprising:
   a first detecting section which detects a position of at least one bolt to be taken out among a plurality of randomly located bolts;
   a first robot having a first robot hand configured to take out the bolt by using positional information of the bolt detected by the first detecting section, and then align and locate the taken out bolt on a bolt placement table;
   a second detecting section which detects a position of the first article;
   a second robot having a second robot hand configured to grip the first article by using positional information of the first article detected by the second detecting section, and then move the first article to an assembling position where a connecting part of the first article and a connecting part of a second article located at a predetermined place contact each other;

a bolt holding and fastening section configured to take out and hold the bolt aligned and located on the bolt placement table, and then rotate the bolt about an axial direction thereof; and an external holding device which receives the first article conveyed to the assembling position by the second robot, and holds the first article at the assembling position, wherein the bolt holding and fastening section takes out and holds the bolt aligned and located on the bolt placement table, and then assembles the first article and the second article by fastening the first and second articles with the bolt while the connecting parts of the first and second articles contact each other, and wherein the bolt holding and fastening section is mounted to the second robot, and the bolt holding fastening section mounted to the second robot fastens the first article held by the external holding device and the second article.

2. The article assembling device as set forth in claim 1, wherein the first detecting section is a first vision sensor having a first camera mounted to the first robot, and the second detecting section is a second vision sensor having a second camera mounted to the second robot.

3. The article assembling device as set forth in claim 1, wherein the bolt holding and fastening section has a rotatable front part and a magnet arranged at the rotatable front part.

4. An article assembling device for taking out and aligning bolts, and attaching a first article to a second article by means of the aligned bolt, the assembling device comprising:

a first detecting section which detects a position of at least one bolt to be taken out among a plurality of randomly located bolts;

a first robot having a first robot hand configured to take out the bolt by using positional information of the bolt detected by the first detecting section, and then align and locate the taken out bolt on a bolt placement table;

a second detecting section which detects a position of the first article;

a second robot having a second robot hand configured to grip the first article by using positional information of the first article detected by the second detecting section, and then move the first article to an assembling position where a connecting part of the first article and a connecting part of a second article located at a predetermined place contact each other;

a bolt holding and fastening section configured to take out and hold the bolt aligned and located on the bolt placement table, and then rotate the bolt about an axial direction thereof;

an external holding device which receives the first article conveyed to the assembling position by the second robot, and holds the first article at the assembling position; and a third robot to which the bolt holding and fastening section is mounted, wherein the bolt holding and fastening section takes out and holds the bolt aligned and located on the bolt placement table, and then assembles the first article and the second article by fastening the first and second articles with the bolt while the connecting parts of the first and second articles contact each other, and wherein the bolt holding fastening section mounted to the third robot fastens the first article held by the external holding device and the second article.

5. The article assembling device as set forth in claim 4, wherein the first detecting section is a first vision sensor having a first camera mounted to the first robot, and the second detecting section is a second vision sensor having a second camera mounted to the second robot.

6. The article assembling device as set forth in claim 4, wherein the bolt holding and fastening section has a rotatable front part and a magnet arranged at the rotatable front part.

* * * * *